3,038,487
SHUTTLE VALVE
Lawrence H. Gardner, North Olmsted, Ohio (% Airmatic Valve, Inc., 7313 Associate Ave., Cleveland 9, Ohio)
Filed Nov. 2, 1960, Ser. No. 66,726
1 Claim. (Cl. 137—112)

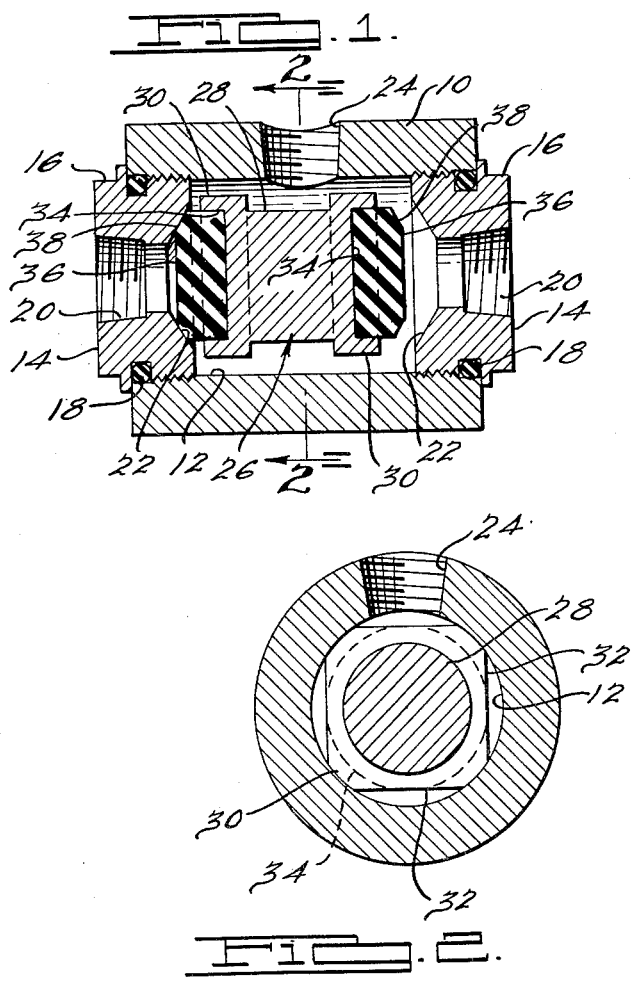

This invention relates to shuttle valves and has particular reference to a valve of this type which is so constructed as to substantially reduce the shock which occurs each time the reciprocable valve member is shifted from one position to the other in conventional shuttle valve constructions.

A shuttle valve of the type to which the invention is directed generally comprises a valve body having a bore therein with an inlet port at each end of the bore and an outlet port intersecting the bore between its ends with a valve member adapted to close one of the inlet ports as it is shifted by pressure fluid delivered through the other inlet port to communicate the outlet port with a source of fluid pressure. Prior valves of this type have been subject to the disadvantage of causing shock in the hydraulic system in which they are used due to the sudden seating of the valve member on one of its valve seats with resultant excessive wear of the valve member and its valve seats. The present invention substantially eliminates such disadvantages by providing a valve member constructed of lightweight material such as aluminum so as to reduce the momentum of the valve member and by the provision of resilient seals at each end of the valve member which engage the valve seats formed around the inlet ports.

A principal object of the invention is to provide a new and improved shuttle valve.

Another object of the invention is to provide a shuttle valve which is simple in construction and which is so designed as to substantially eliminate shock in the hydraulic system in which it is used and to reduce excessive wear of the sealing surfaces of the valve.

Other and further objects of the invention will be apparent from the following description and claim and may be understood by reference to the accompanying drawing, which by way of illustration shows a preferred embodiment of the invention and what I now consider to be the best mode of applying the principles thereof. Other embodiments of the invention may be used without departing from the scope of the present invention as set forth in the appended claim.

In the drawing:

FIG. 1 is a sectional view of a shuttle valve embodying the present invention; and FIG. 2 is a sectional view taken on line 2—2 of FIG. 1.

The valve comprises a valve body 10 having a central bore 12 therein which is integrally threaded at its opposite ends to receive end plugs 14 which are threaded into the opposite ends of the valve body. The end plugs 14 are provided with enlarged outer ends having flats 16 thereon by means of which the end plugs may be threaded into the valve body. An O-ring 18 located in a groove in each end plug provides a seal between the end plug and the valve body.

Each of the end plugs is provided with an inlet port 20 terminating in a conical valve seat 22 which surrounds the inlet port. The valve body 10 is provided with an outlet port 24 which intersects the bore 12 between the end plugs 14. A shuttle valve member 26 is reciprocable within the bore 12 and is formed with a cylindrical central portion 28 and end portions 30 which are noncylindrical in cross section and have flat sides 32 which provide for the flow of fluid past the end portions 30 of the valve member.

The valve member 26 is provided with a socket 34 at each end thereof containing a seal 36 made of resilient sealing material and having a conical sealing surface 38 adapted to sealingly engage the adjacent valve seat 22. The sealing surfaces 38 of the valve member 26 are spaced apart a distance which is only slightly less than the spacing between the valve seats 22 so that the valve member travels only a short distance from one end of its stroke to the other.

The inlet ports 20 may be connected to two different sources of fluid pressure under the control of suitable valve means so that pressure fluid may be delivered to a selected one of the inlet ports 20 while the other inlet port is disconnected from its pressure source. With pressure fluid supplied through the right-hand inlet port 20, the valve member will be shifted to the left as shown in FIG. 1 to close the other inlet port while communicating the outlet port 24 with the right-hand inlet port. The valve member 26 is made of aluminum or other lightweight material so as to reduce its momentum and thus reduce the force with which it engages the valve seats 22. This construction substantially eliminates shock in the hydraulic system in which the valve is used and substantially reduces wear of the seal inserts 36 and the valve seats 22.

While I have illustrated and described a preferred embodiment of my invention, it is understood that this is capable of modification, and I therefore do not wish to be limited to the precise details set forth but desire to avail myself of such changes and alterations as fall within the purview of the following claim.

I claim:

A shuttle valve comprising a valve body having a cylindrical bore therein, an end plug closing each end of said bore, an inlet port in each end plug communicating with said bore, an outlet port intersecting said bore between said end plugs, each of said end plugs having a valve seat thereon surrounding the inlet port therein, a valve member reciprocable in said bore, a socket in each end of said valve member, a resilient seal in each of said sockets and projecting beyond the end of said valve member for sealing engagement with the opposing valve seat, said valve member being shifted into engagement with one of said valve seats to close the associated inlet port in response to pressure fluid delivered through the other inlet port, said valve member having a cylindrical central portion of smaller diameter than said bore and end portions which are non-circular in cross section thereby to provide for the flow of fluid from selected inlet port to said outlet port, said valve member being made of aluminum so as to reduce its momentum and thereby eliminate shock as said valve member engages said valve seats.

References Cited in the file of this patent
UNITED STATES PATENTS
2,805,040   Voss ------------------ Sept. 3, 1957
FOREIGN PATENTS
500,651   Italy ------------------ Nov. 19, 1954